United States Patent
Koga

(10) Patent No.: US 12,548,780 B2
(45) Date of Patent: Feb. 10, 2026

(54) BATTERY AND LAMINATED BATTERY

(71) Applicant: Panasonic Intellectual Property Management Co., Ltd., Osaka (JP)

(72) Inventor: Eiichi Koga, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 692 days.

(21) Appl. No.: 17/933,503

(22) Filed: Sep. 20, 2022

(65) Prior Publication Data
US 2023/0009610 A1    Jan. 12, 2023

Related U.S. Application Data

(63) Continuation of application No. PCT/JP2021/008438, filed on Mar. 4, 2021.

(30) Foreign Application Priority Data

Apr. 15, 2020  (JP) ................. 2020-073128

(51) Int. Cl.
  H01M 4/70      (2006.01)
  H01M 10/0585   (2010.01)
  H01M 10/0562   (2010.01)

(52) U.S. Cl.
  CPC ......... *H01M 4/70* (2013.01); *H01M 10/0585* (2013.01); *H01M 10/0562* (2013.01)

(58) Field of Classification Search
  CPC ............ H01M 4/70; H01M 10/0585; H01M 10/0562; H01M 4/13; H01M 10/0418; H01M 10/0525; Y02E 60/10; Y02P 70/50
  See application file for complete search history.

(56) References Cited

U.S. PATENT DOCUMENTS

| | | | |
|---|---|---|---|
| 2015/0243962 A1* | 8/2015 | Hiroki | H01M 4/139 429/233 |
| 2017/0025682 A1* | 1/2017 | Ji | H01M 4/70 |

FOREIGN PATENT DOCUMENTS

| | | |
|---|---|---|
| JP | 7-335209 | 12/1995 |
| JP | 11-288723 | 10/1999 |
| JP | 2015-118788 | 6/2015 |
| JP | 6020437 B2 * | 11/2016 |
| JP | 6704295 B2 * | 6/2020 |

OTHER PUBLICATIONS

JP 6020437 B2 (Machine Translation) (Year: 2025).*
JP_6704295_B2_-_Machine_Translation (Year: 2025).*
International Search Report of PCT application No. PCT/JP2021/008438 dated Apr. 20, 2021.

* cited by examiner

*Primary Examiner* — Nicole M. Buie-Hatcher
*Assistant Examiner* — Kenneth Max Otero
(74) *Attorney, Agent, or Firm* — Greenblum & Bernstein, P.L.C.

(57) ABSTRACT

A battery includes a first electrode, a second electrode, and a solid electrolyte layer located between the first electrode and the second electrode. The first electrode includes a first collector and a first active material layer located between the first collector and the solid electrolyte layer. The first collector has at least one first slit, the at least one first slit penetrating the first collector in a thickness direction and being connected to an outer edge of the first collector.

18 Claims, 8 Drawing Sheets

BATTERY AND LAMINATED BATTERY

BACKGROUND

1. Technical Field

The present disclosure relates to a battery and a laminated battery.

2. Description of the Related Art

Japanese Unexamined Patent Application Publication No. 11-288723 discloses a lithium-ion battery having a hole provided in an inner region of a collecting plate. Further, Japanese Unexamined Patent Application Publication No. 7-335209 discloses a storage battery having a metal porous body used as a collector.

SUMMARY

One non-limiting and exemplary embodiment provides a highly-reliable battery and a highly-reliable laminated battery.

In one general aspect, the techniques disclosed here feature a battery including a first electrode, a second electrode, and a solid electrolyte layer located between the first electrode and the second electrode. The first electrode includes a first collector and a first active material layer located between the first collector and the solid electrolyte layer. The first collector has at least one first slit, the at least one first slit penetrating the first collector in a thickness direction and being connected to an outer edge of the first collector.

The present disclosure makes it possible to provide a highly-reliable battery and a highly-reliable laminated battery.

Additional benefits and advantages of the disclosed embodiments will become apparent from the specification and drawings. The benefits and/or advantages may be individually obtained by the various embodiments and features of the specification and drawings, which need not all be provided to obtain one or more of such benefits and/or advantages.

DETAILED DESCRIPTIONS

Brief Overview of the Present Disclosure

Figure 1:
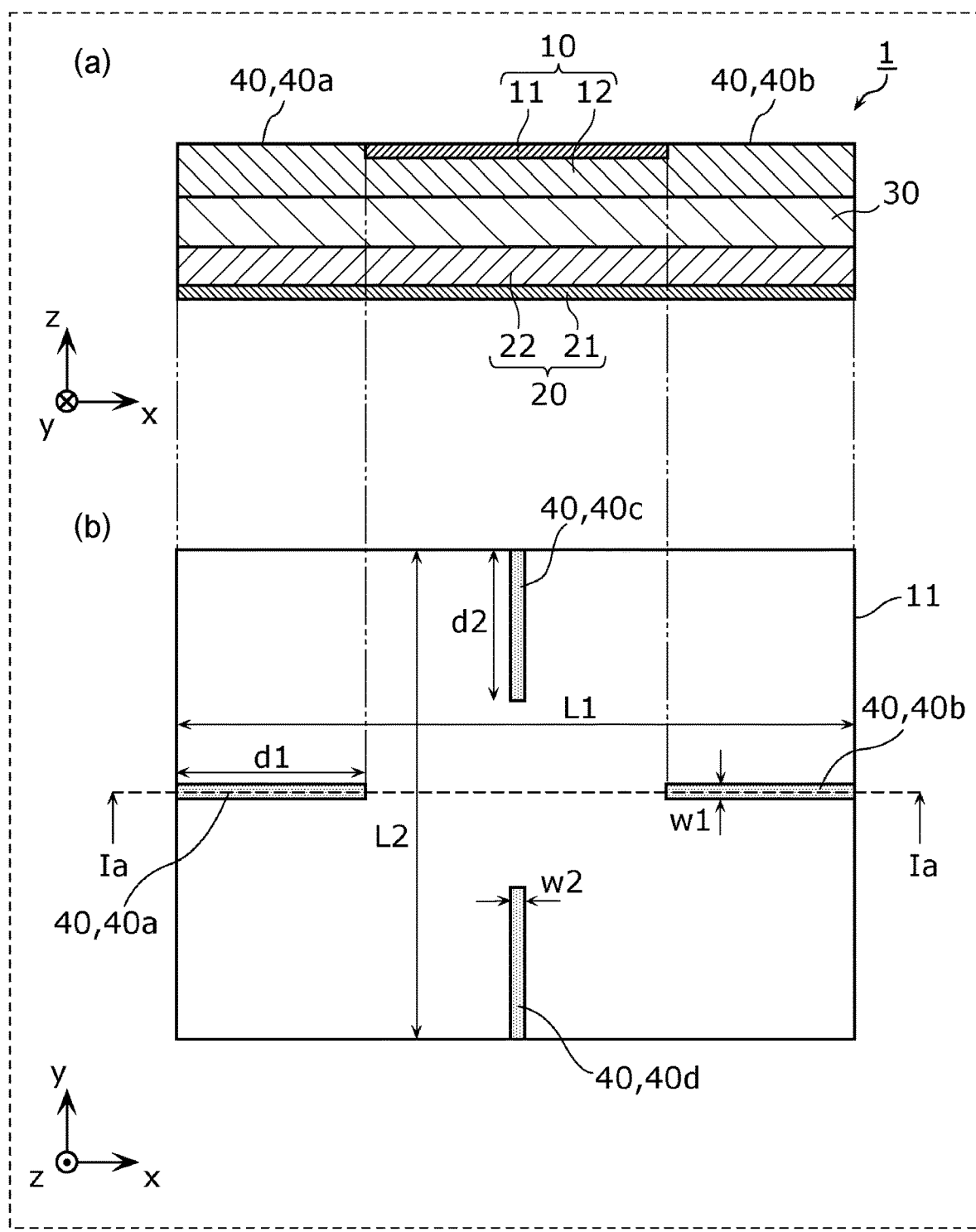
FIG. 1 illustrates a cross-sectional view and a plan view schematically showing a configuration of a battery according to Embodiment 1.

A battery according to an aspect of the present disclosure includes a first electrode, a second electrode, and a solid electrolyte layer located between the first electrode and the second electrode. The first electrode includes a first collector and a first active material layer located between the first collector and the solid electrolyte layer. The first collector has at least one first slit, the least one first slit penetrating the first collector in a thickness direction and being connected to an outer edge of the first collector.

This configuration inhibits delamination attributed to air remaining in a laminated body that constitutes a battery, giving an elaborate battery with few structural defects. Especially in a large-area battery or a thin-layer battery, air tends to remain in the laminated body. The battery according to the present aspect facilitates the discharge of air along a slit from a central region of the laminated body to an outer edge during pressurization on the laminated body. This reduces structural defects and increases the density of the laminated body, thus achieving a highly-reliable battery.

Further, for example, the at least one first slit may include a plurality of the first slits.

This makes it possible to further facilitate the discharge of air out of the laminated body. That is, this makes it possible to achieve an elaborate battery with few structural defects, as air is more easily discharged.

Further, for example, the first collector may be oblong or square in planimetric shape. Further, for example, the plurality of first slits may consist of four first slits connected separately to a middle of each of sides of the first collector in plan view.

This gives a uniform discharge distribution of air with imbalances reduced in a plane. This also makes it possible to connect the outer edge of the collector to the vicinity of the center with a short slit. This in turn makes it possible to reduce the area that the slit occupies in the collector, making it possible to increase the capacity of the battery.

Further, for example, the plurality of first slits may be provided in point symmetry with respect to a center of the first collector in plan view.

This gives a uniform discharge distribution of air with imbalances reduced in a plane. This in turn reduces the occurrence of warpage, making it possible to achieve a low-profile and large-size battery.

Further, for example, the at least one first slit may have a side wall inclined with respect to the thickness direction of the first collector.

Such inclination of the side wall of the slit leads to an increased area of contact between the side wall and the active material layer or electrolyte component with which the slit is filled. This brings about a strong working effect against delamination of the collector. This makes it possible to further strengthen the bondability between the collector and the active material layer while reducing structural defects in the battery.

Further, for example, the at least one first slit may have a cross-sectional shape that is a trapezoidal shape having a first side beside the second electrode and a second side opposite the first side with the first side being shorter than the second side.

This gives a structure in which a filling component such as the active material layer or the electrolyte in the slit is caught and hardly comes out even if the delamination stress of the collector acts, as the width of the slit becomes narrower toward the side of the collector that faces toward the active material layer. Such a structure makes it possible to further strengthen the bondability of the collector while reducing structural defects.

Further, for example, the at least one first slit may have a width that, in plan view, is greater in a portion thereof that is close to the outer edge of the first collector than in a portion thereof that is away from the outer edge.

This makes it possible to further facilitate the discharge of air out of the laminated body. That is, this makes it possible to achieve an elaborate battery with few structural defects, as air is more easily discharged.

Further, for example, the at least one first slit may have a bent part in plan view.

This further strengthens the anchoring effect between the collector and the active material layer. This makes it possible to achieve a more highly-reliable battery.

Further, for example, the first slit may have a width greater than or equal to 0.1 mm and less than or equal to 5 mm.

In a case where the slit width is too great, the battery capacity decreases. Since the width of the slit is greater than or equal to 0.1 mm and less than or equal to 5 mm, improvement in reliability of the battery by an air-discharging effect and an increase in capacity of the battery can both be achieved.

Further, for example, the first slit may extend in one direction from the outer edge toward an inner side of the first collector. A length of the first slit in the one direction may be greater than or equal to 6% of a length of the first collector in the one direction.

This makes it possible to discharge air that may also remain in a portion comparatively close to the outer edge, making it possible to achieve a highly-reliable battery.

Further, for example, the length of the first slit in the one direction may be less than 50% of the length of the first collector in the one direction.

This makes it possible to effectively discharge air through the center of the laminated body, making it possible to achieve a highly-reliable battery.

Further, for example, the first active material layer may be smaller in area than the first collector in plan view. The first collector may include a first region in contact with the first active material layer and a second region in contact with the solid electrolyte layer.

According to this configuration, after, during pressurization on the laminated body, air has been discharged through a slot provided in the second region, the solid electrolyte deforms and infiltrates into the slit while maintaining its softness, so that the slit is easily filled with the solid electrolyte. This makes it possible to surely bring about a strong anchoring effect.

Further, for example, the at least one first slit may be provided in the second region and may not be provided in the first region.

For example, providing the soft solid electrolyte in the second region makes it easy for the slit to be filled with the solid electrolyte deforming during pressurization on the laminated body. This allows the anchoring effect to act strongly even with the second region alone. This reduces defects in and increases the density of a large-size and low-profile battery without affecting a power-generating element.

Further, for example, the first slit may be filled with a material contained in a layer in contact with a surface of the first collector that faces toward the second electrode. Further, for example, the layer may be the first active material layer or the solid electrolyte layer.

According to this configuration, in a case where pressurization has been performed on the laminated body, the slit bites a layer, such as the active material layer or the solid electrolyte layer in contact with the slit. This brings about an anchoring effect, thus bringing about improvement in strength of a bonding interface between the collector and the layer and making it possible to achieve a high-cycle-characteristic and highly-reliable battery.

Further, for example, the second electrode may include a second collector and a second active material layer located between the second collector and the solid electrolyte layer. The second collector may have at least one second slit, the at least one second slit penetrating the second collector in a thickness direction and being connected to an outer edge of the second collector.

This makes it possible to easily discharge air through both sides of the laminated body in a direction of laminating. That is, this makes it possible to achieve an elaborate battery with few structural defects, as air is even more easily discharged.

Further, for example, a laminated battery according to an aspect of the present disclosure includes a first battery and a second battery each of which is the battery according to the aforementioned aspect. The first battery is laminated on a surface of the first collector of the second battery that faces away from the first active material layer.

This makes it possible to achieve a high-capacity or high-energy-density and highly-reliable battery.

Further, for example, the first collector of the first battery and the first collector of the secondary battery may be collectors that are different in polarity from each other. The first battery and the second battery may be laminated so that the first collectors are contact with each other. The at least one first slit of the first battery may not overlap any of the at least one first slit of the second battery in plan view.

According to this configuration, the slits of the collectors to be joined are placed so as not to overlap each other, whereby, for example, the collectors joined on top of each other can be configured as a bipolar electrode. That is, the batteries can be connected in series. For example, multi-layering of large-size and low-profile batteries makes it possible to achieve a high-energy and high-capacity battery compatible with high voltage.

Further, for example, the first collector of the first battery and the first collector of the secondary battery may be collectors that are identical in polarity to each other. The first battery and the second battery may be laminated so that the first collectors are contact with each other. At least part of the at least one first slit of the first battery may overlap the at least one first slit of the second battery in plan view.

According to this configuration, the filling components into the slits of the active material layers or solid electrolytes of the upper and lower batteries are easily bonded to each other through the slits. This makes it possible to achieve a highly-reliable battery of integral construction. For example, a highly-reliable, high-capacity battery can be achieved by configuring batteries connected in parallel.

As noted above, in each aspect, delamination of a layer that constitutes a laminated body is inhibited, and structural defects that are caused by residual air are reduced. This makes it possible to achieve a highly-reliable battery.

The following describes embodiments in concrete terms with reference to the drawings.

It should be noted that the embodiments to be described below each illustrate a comprehensive and specific example. The numerical values, shapes, materials, constituent elements, placement and topology of constituent elements, or other features that are shown in the following embodiments are just a few examples and are not intended to limit the present disclosure. Further, those of the constituent elements in the following embodiments which are not recited in an independent claim are described as optional constituent elements.

Further, the drawings are schematic views, and are not necessarily strict illustrations. Accordingly, for example, the drawings are not necessarily to scale. In the drawings, substantially the same components are given the same reference signs, and a repeated description may be omitted or simplified.

Further, in the present specification and drawings, the x axis, the y axis, and the z axis represent the three axes of a three-dimensional orthogonal coordinate system. In each of the embodiments, the z-axis direction is a thickness direction of a battery. Further, the term "thickness direction" used herein means a direction perpendicular to a plane of laminating of each layer.

Further, the term "plan view" used herein means a case where the battery is seen from an angle parallel with a direction of laminating in the battery, and the term "thickness" used herein means the length of the battery and each layer in the direction of laminating.

Further, the terms "inner" and "outer" in terms such as "inner side" and "outer side" used herein mean the inside and outside of the battery as seen from an angle parallel with the direction of laminating in the battery.

Further, the terms "upper" and "lower" in the configuration of a battery used herein do not refer to an upward direction (upward in a vertical direction) and a downward direction (downward in a vertical direction) in absolute space recognition, but are used as terms that are defined by a relative positional relationship on the basis of an order of laminating in a laminating configuration. Further, the terms "above" and "below" are applied not only in a case where two constituent elements are placed at a spacing from each other with another constituent element present between the two constituent elements, but also in a case where two constituent elements are in contact with each other by being placed in close contact with each other.

Embodiment 1

Brief Overview of Battery

First, a battery according to Embodiment 1 is described with reference to FIG. 1.

FIG. 1 illustrates a cross-sectional view and a plan view schematically showing a configuration of a battery 1 according to the present embodiment. Specifically, (a) of FIG. 1 is a cross-sectional view of the battery 1. (b) of FIG. 1 is a plan view of the battery 1 as seen from the positive side of the z-axis. (a) of FIG. 1 shows a cross-section as taken along line Ia-Ia in (b) in FIG. 1. In (b) of FIG. 1, a slit 40 is shaded so that the shape of the slit 40 is clarified. The same applies to the after-mentioned other plan views.

As shown in FIG. 1, the battery 1 includes a first electrode 10, a second electrode 20, and a solid electrolyte layer 30 located between the first electrode 10 and the second electrode 20. The battery 1 is an all-solid battery.

The first electrode 10 includes a first collector 11 and a first active material layer 12. The first active material layer 12 is an example of a first electrode layer located between the first collector 11 and the solid electrolyte layer 30. The first active material layer 12 is in contact with a surface of the first collector 11 that faces toward the solid electrolyte layer 30.

The second electrode 20 is a counter electrode that corresponds to the first electrode 10. The second electrode 20 includes a second collector 21 and a second active material layer 22. The second active material layer 22 is an example of a second electrode layer located between the second collector 21 and the solid electrolyte layer 30. The second active material layer 22 is in contact with a surface of the second collector 21 that faces toward the solid electrolyte layer 30.

The solid electrolyte layer 30 is an example of an electrolyte layer located between the first electrode 10 and the second electrode 20.

The following describes the details of the layers of the battery 1.

In the battery 1 according to the present embodiment, the first electrode 10 serves as a positive electrode, and the second electrode 20 serves as a negative electrode. That is, the first collector 11 serves a positive-electrode collector, and the first active material layer 12 contains a positive-electrode active material. The second collector 21 is a negative-electrode collector, and the second active material layer 22 contains a negative-electrode active material.

Alternatively, the first electrode 10 may serve as a negative electrode, and the second electrode 20 may serve as a positive electrode. That is, the first collector 11 may serve as a negative-electrode collector, and the first active material layer 12 may contain a negative-electrode active material. The second collector 21 may serve as a positive-electrode collector, and the second active material layer 22 may contain a positive-electrode active material.

The first collector 11, the first active material layer 12, the solid electrolyte layer 30, the second active material layer 22, and the second collector 21 are each oblong in planimetric shape. The planimetric shapes of the first collector 11, the first active material layer 12, the solid electrolyte layer 30, the second active material layer 22, and the second collector 21 are not limited to particular shapes but may be squares or non-rectangular shapes such as circles, ellipses, or polygons.

Further, although, in the present embodiment, the first collector 11, the first active material layer 12, the solid electrolyte layer 30, the second active material layer 22, and the second collector 21 are identical in size to one another and of uniform contour in plan view, this is not intended to impose any limitation. For example, the first active material layer 12 may be smaller than the second active material layer 22. The first active material layer 12 and the second active material layer 22 may be smaller than the solid electrolyte layer 30.

The first collector 11 and the second collector 21 are sometimes collectively simply referred to as "collector" in a case where they are not particularly distinguished from each other. The collector needs only be formed of a material having electric conductivity and are not limited to a particular collector.

The collector may be made, for example, of a foil-like body, a plate-like body, or a net-like body composed, for example, of stainless steel, nickel (Ni), aluminum (Al), iron (Fe), titanium (Ti), copper (Cu), palladium (Pd), gold (Au), platinum (Pt), or an alloy of two or more of these metals. The material of the collector is selected as appropriate in consideration of manufacturing processes, non-solubility and non-decomposability of the material at operating temperature and under working pressure, and the operating potential of a battery that is applied to the collector, and the electrical conductivity of the battery. Further, the material of the collector may also be selected according to tensile strength and heat resistance requirements. The collector may for example be made of a clad material including a laminating body of sheets of high-strength electrolytic copper foil or dissimilar metal foil.

The thickness of the collector falls within a range of, for example, 10 μm to 100 μm. From the point of view of enhancing the adhesion with the first active material layer 12 or the second active material layer 22, the collector may have its surface processed into a rough surface with asperities. Further, the collector may have its surface coated with an adhesive component such as an organic binder. This strengthens the bondability of an interface between the collector and another layer, making it possible to enhance the mechanical and thermal reliability, cycle characteristic, or other features of the battery 1.

As shown in (a) and (b) of FIG. 1, the first collector 11 is provided with at least one slit 40. The second collector 21 is not provided with a slit. A specific structure of a slit 40 and effects brought about by providing a slit 40 will be described later.

The first active material layer 12 is located between the first collector 11 and the solid electrolyte layer 30. Specifically, the first active material layer 12 is placed in contact with a principal surface of the first collector 11 that faces toward the solid electrolyte layer 30. In the present embodiment, the first active material layer 12 covers the entire principal surface of the first collector 11. The first active material layer 12 contains at least a positive-electrode active material. That is, the first active material layer 12 is a layer primarily containing a positive-electrode material such as the positive-electrode active material.

The positive-electrode active material is a substance that is oxidized or reduced by the insertion or desorption of metal ions such as lithium (Li) ions or magnesium (Mg) ions into or out of a crystal structure at a potential higher than that of a negative electrode. The type of the positive-electrode active material can be selected as appropriate according to the type of the battery 1, and a publicly-known positive-electrode active material may be used.

As the positive-electrode active material, a compound containing lithium and a transition metal element is used. Usable examples include an oxide containing lithium and a transition metal element and a phosphate compound containing lithium and a transition metal element. Usable examples of the oxide containing lithium and a transition metal element include a lithium-nickel complex compound such as $LiNi_xM_{1-x}O_2$ (where M is at least one element of Co, Al, Mn, V, Cr, Mg, Ca, Ti, Zr, Nb, Mo, and W and x is $0<x\leq1$), a lamellar oxide such as lithium cobalt oxide ($LiCoO_2$), lithium nickel oxide ($LiNiO_2$), and lithium manganese oxide ($LiMn_2O_4$), and spinel structure lithium manganese oxides ($LiMn_2O_4$, $Li_2MnO_3$, $LiMnO_2$). Usable examples of the phosphate compound containing lithium and a transition metal element include olivine structure lithium iron phosphate ($LiFePO_4$). Alternatively, sulfur (S) or a sulfide such as lithium sulfide ($Li_2S$) may be used. In that case, the positive-electrode active material may be one obtained by coating positive-electrode active material particles with lithium niobate ($LiNbO_3$) or other substances or adding lithium niobate ($LiNbO_3$) or other substances to positive-electrode active material particles. As the positive-electrode active material, only one of these materials may be used, or a combination of two or more of these materials may be used.

As mentioned above, the first active material layer 12, which is a positive-electrode active material layer, needs only contain at least the positive-electrode active material. The first active material layer 12 may be a compound layer composed of the positive-electrode active material and another additive material. Usable example of another additive material includes a solid electrolyte such as an inorganic solid electrolyte or a sulfide solid electrolyte, a conductive auxiliary agent such as acetylene black, and a binding binder such as polyethylene oxide or polyvinylidene fluoride. Mixing the positive-electrode active material and another additive material such as a solid electrolyte in predetermined proportions allows the first active material layer 12 to have improved lithium ion conductivity within the first active material layer 12 and to have improved electron conductivity.

The thickness of the first active material layer 12 falls within, but is not limited to, a range of, for example, 5 μm to 300 μm.

The second active material layer 22 is located between the second collector 21 and the solid electrolyte layer 30. Specifically, the second active material layer 22 is placed in contact with a principal surface of the second collector 21 that faces toward the solid electrolyte layer 30. In the present embodiment, the second active material layer 22 covers the entire principal surface of the second collector 21. The second active material layer 22 contains at least a negative-electrode active material. That is, the second active material layer 22 is a layer primarily containing a negative-electrode material such as the negative-electrode active material.

The negative-electrode active material is a substance that is oxidized or reduced by the insertion or desorption of metal ions such as lithium (Li) ions or magnesium (Mg) ions into or out of a crystal structure at a potential lower than that of a positive electrode. The type of the negative-electrode active material can be selected as appropriate according to the type of the battery 1, and a generally known negative-electrode active material may be used.

Usable examples of the negative-electrode active material include a carbon material such as natural graphite, artificial graphite, graphite carbon fiber, resin heat-treated carbon and an alloy material that is combined with a solid electrolyte to form a compound. Usable examples of the alloy material include a lithium alloy such as LiAl, LiZn, $Li_3Bi$, $Li_3Cd$, $Li_3Sb$, $Li_4Si$, $Li_{4.4}Pb$, $Li_{4.4}Sn$, $Li_{0.17}C$, or $LiC_6$, an oxide of lithium and a transition metal element such as lithium titanium oxide ($Li_4Ti_5O_{12}$), zinc oxide (ZnO), and a metal oxide such as silicon oxide ($SiO_x$). As the negative-electrode active material, only one of these materials may be used, or a combination of two or more of these materials may be used.

As mentioned above, the second active material layer 22, which is a negative-electrode active material layer, needs only contain at least the negative-electrode active material. The second active material layer 22 may be a compound layer composed of the negative-electrode active material and another additive material. Usable example of another additive material includes a solid electrolyte such as an inorganic solid electrolyte or a sulfide solid electrolyte, a conductive auxiliary agent such as acetylene black, and a binding binder such as polyethylene oxide or polyvinylidene fluoride. Mixing the negative-electrode active material and another additive material such as a solid electrolyte in predetermined proportions allows the second active material layer 22 to have improved lithium ion conductivity within the second active material layer 22 and to have improved electron conductivity.

The thickness of the second active material layer 22 falls within, but is not limited to, a range of, for example, 5 μm to 300 μm.

The solid electrolyte layer 30 are disposed between the first active material layer 12 and the second active material layer 22, and are in contact with each of the layers. The solid electrolyte layer 30 contains at least a solid electrolyte. The solid electrolyte layer 30 contains the solid electrolyte, for example, as a major ingredient.

The solid electrolyte needs only be a generally known battery-use solid electrolyte having ion conductivity. Usable examples of the solid electrolyte include a solid electrolyte that conducts metal ions such as lithium ions and magnesium ions. The type of the solid electrolyte may be selected as appropriate according to the type of ion to be conducted.

Usable examples of the solid electrolyte include an inorganic solid electrolyte such as a sulfide solid electrolyte or an oxide solid electrolyte. Usable examples of the sulfide solid electrolyte include a lithium-containing sulfide such as $Li_2S—P_2S_5$, $Li_2S—SiS_2$, $Li_2S—B_2S_3$, $Li_2S—GeS_2$, $Li_2S—SiS_2—LiI$, $Li_2S—SiS_2—Li_3PO_4$, $Li_2S—Ge_2S_2$, $Li_2S—GeS_2—P_2S_5$, or $Li_2S—GeS_2—ZnS$. Usable examples of the oxide solid electrolyte include a lithium-containing metal oxide such as $Li_2O—SiO_2$ or $Li_2O—SiO_2—P_2O_5$, a lithium-containing metal nitride such as $Li_xP_yO_{1-z}N_z$, lithium phosphate ($Li_3PO_4$), and a lithium-containing transition metal oxide such as a lithium titanium oxide. As the solid electrolyte, only one of these materials may be used, or a combination of two or more of these materials may be used. In the present embodiment, the solid electrolyte layer 30 contains, as an example, a solid electrolyte having lithium ion conductivity.

The solid electrolyte layer 30 may contain a binding binder such as polyethylene oxide or polyvinylidene fluoride in addition to the aforementioned solid electrolyte material.

The thickness of the solid electrolyte layer 30 falls within, but is not limited to, a range of, for example, 5 μm to 150 μm.

The solid electrolyte layer 30 may be configured as an aggregate of particles of the solid electrolyte. Alternatively, the solid electrolyte layer 30 may be constituted by sintered tissue of the solid electrolyte.

Slit

Next, the details of a slit 40 provided in the first collector 11 are described.

As shown in (a) and (b) of FIG. 1, the first collector 11 is provided with at least one slit 40. The at least one slit 40 is an example of a first slit, the at least one slit 40 penetrates the first collector 11 in a thickness direction and is connected to an outer edge of the first collector 11. The slit 40 extends in one direction from the outer edge of the first collector 11 toward an inner side of the first collector 11. Specifically, the slit 40 is formed by boring through the first collector 11 from the outer edge of the first collector 11 toward the inner side. The outer edge is part of the contours of the first collector 11 in plan view.

The slit 40 is filled with a material contained in a layer in contact with a surface of the first collector 11 that faces toward the second electrode 20. In other words, the slit 40 bites a layer in contact with a surface that faces toward the second electrode 20. In the present embodiment, as shown in (a) of FIG. 1, the slit 40 is filled with part of the first active material layer 12, as the first active material layer 12 is a layer in contact with a surface that faces toward the second electrode 20. Part of the first active material layer 12 for example completely fills the slit 40. Alternatively, part of the first active material layer 12 may be provided only in part of the slit 40. That is, the slit 40 may have a residual air gap in which part of the first active material layer 12 is not present.

In the present embodiment, the first collector 11 has a plurality of the slits 40. Specifically, as shown in (b) of FIG. 1, the first collector 11 has four slits 40a, 40b, 40c, and 40d. The four slits 40a, 40b, 40c, and 40d are connected to the middle of each of sides of the first collector 11 in plan view. Specifically, the four slits 40a, 40b, 40c, and 40d are formed separately in a linear fashion from the midpoint of each of the four sides of the first collector 11 toward the center of the first collector 11.

The slits 40a and 40b are connected to short sides of the first collector 11. The slits 40a and 40b have elongated shapes extending from the middles of the short sides of the first collector 11 in a direction orthogonal to the short sides, i.e. a direction (x-axis direction) parallel to long sides. The slits 40a and 40b are provided in the same straight line that extends in the x-axis direction. For example, the slits 40a and 40b have the same width w1 and the same length d1 as each other. It should be noted that the width of a slit is the length of the short sides of the slit. The length of a slit is the length of the long sides of the slit.

The slits 40c and 40d are connected to the long sides of the first collector 11. The slits 40c and 40d have elongated shapes extending from the middles of the long sides of the first collector 11 in a direction orthogonal to the long sides, i.e. a direction (y-axis direction) parallel to the short sides. The slits 40c and 40d are provided in the same straight line that extends in the y-axis direction. For example, the slits 40c and 40d have the same width w2 and the same length d2 as each other. The width w2 is for example equal to the width w1. Alternatively, the width w1 may be shorter than or longer than the width w1. Further, the length d2 is for example shorter than the length d1. Alternatively, the length d2 may be equal to or longer than the length d1.

It should be noted that the four slits 40a, 40b, 40c, and 40d are described as "slit 40" in a case where they are not particularly distinguished from one another.

The width, length, and height of the slit 40 are set so that no delamination occurs in a laminated body at the time of laminating by which the battery 1 is integrated. Assume a case, for example, where the battery 1 has the shape of a 150 mm×100 mm rectangle and a thickness of approximately 200 μm. In this case, for example, a Cu collector having the shape of a 150 mm×100 mm rectangle and a thickness of approximately 15 μm can be used as the first collector 11. Then, the widths w1 and w2 of the slit 40 are for example approximately 100 μm. The slits 40a and 40b extend from the midpoints of the short sides of the first collector 11 in directions toward the center of the first collector 11. The length d1 of each of the slits 40a and 40b is approximately 33% of the length L1 of the long sides of the first collector 11, specifically 50 mm. The slits 40c and 40d extend from the midpoints of the long sides of the first collector 11 in directions toward the center of the first collector 11. The length d2 of each of the slits 40c and 40d is approximately 30% of the length L2 of the short sides of the first collector 11, specifically 30 mm. The slits 40a, 40b, 40c, and 40d are provided in point symmetry with respect to the center of the first collector 11.

In the case of a thin-layer laminated body having a thickness of 100 µm, air may remain in a region situated 6% inward (with respect to the distance to an opposite side) and cannot be discharged out of the region, although the region is relatively close to the outer edge. For this reason, for example, the length d1 of the slits 40a and 40b is set to be greater than or equal to 6% of the length L1 of the long sides of the first collector 11. Further, the length d2 of the slits 40c and 40d is set to be greater than or equal to 6% of the length L2 of the short sides of the first collector 11. This makes it possible to inhibit delamination of the laminated body and reduce the occurrence of structural defects. Providing a slit 40 whose length is greater than or equal to 6% of that of each side makes it possible to achieve a highly-reliable battery 1, albeit depending on where air stays.

The length d1 of the slits 40a and 40b is for example less than 50% of the length L1 of the long sides of the first collector 11. That is, the slits 40a and 40b are not connected to each other. The length d2 of the slits 40c and 40d is for example less than 50% of the length L2 of the short sides of the first collector 11. That is, the slits 40c and 40d are not connected to each other. Since no slit 40 is provided near the center of the battery 1, a power-generating region can be surely secured. It should be noted that the slit 40 may reach the center of the first collector 11 so that the first collector 11 may be divided by the slit 40. Even such a slit 40 may be provided insofar as there are no problems in manufacturing or in characteristics of the battery 1.

Further, the widths w1 and w2 of the slit 40 are for example greater than or equal to 0.1 mm and less than or equal to 5 mm. This is effective in inhibiting delamination, as the greater the widths w1 and w2 of the slit 40 are, the easier air is discharged. Further, even in a case where the slit 40 is as sufficiently small in width as a cut made in the first collector 11 by a cutter blade, the slit 40 brings about an air-discharging effect in comparison with a case where there is no cut.

The slit 40 is formed, for example, by notching part of the first collector 11 after having laminated the first collector 11, the first active material layer 12, the solid electrolyte layer 30, the second active material layer 22, and the second collector 21 in this order. Alternatively, the first collector 11 may be laminated with the slit 40 formed in advance therein. Applying pressure in the thickness direction to a laminated body including the first collector 11 with the slit 40 provided therein causes air to be discharged out of the laminated body.

Figure 2:
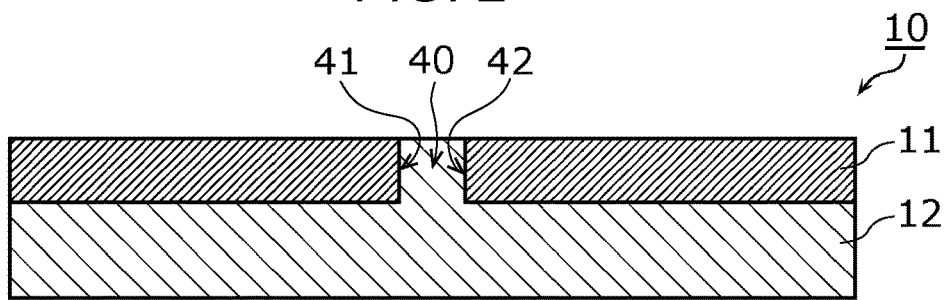
FIG. 2 is a cross-sectional view schematically showing an example of a configuration of a cross-section of a slit provided in a collector of the battery according to Embodiment 1.

FIG. 2 is a cross-sectional view schematically showing a first example of a configuration of a cross-section of a slit 40 provided in the first collector 11 of the battery 1 according to the present embodiment. Specifically, FIG. 2 shows a cross-section of the slit 40 orthogonal to the long sides of the slit 40. The same applies to FIGS. 3 to 5, which will be described later.

As shown in FIG. 2, the slit 40 is filled with part of the first active material layer 12 in contact with the first collector 11. That is, the slit 40 has its side walls 41 and 42 in contact with the first active material layer 12. Accordingly, the difference in level of the first collector 11 formed by the slit 40 is reduced by being filled with part of the first active material layer 12. Although the present embodiment schematically illustrates a state where the slit 40 is completely filled, the slit 40 needs only be partially filled so that an anchoring effect is brought about by the effect of bonding of part of the first active material layer 12 to the side walls 41 and 42 of the slit 40. This brings about further improvement in the effect of inhibiting delamination of the first collector 11 than in a state where the slit 40 is not filled.

For further improvement in anchoring effect intended to prevent delamination of the first collector 11, an appropriate number of holes of arbitrary shapes may be provided in the first collector 11 in addition to the slit 40, which is provided from the outer edge of the first collector 11, insofar as there are no harmful effects on battery characteristics.

The following more specifically describes the action of a slit 40 that is formed in the first collector 11.

Providing the first collector 11 with a slit 40 connected to the outer edge makes it possible to more effectively discharge air out of the laminated body in the process of compressing the laminated body than in a case where no slit 40 is provided or a case where holes or grooves not connected to the outer edge are provided. Further, the anchoring effect of a site of bonding with the first active material layer 12 with which the slit 40 is filled makes it possible to enhance the sticking tendency of the first collector 11.

For example, in the case of holes or grooves not communicating with the outer edge, the first collector 11 has its principal surface closed by a press die during compression. This makes these holes or grooves unable to function as air-discharging paths. This causes more air to remain without being discharged out of the laminated body and form air holes or delamination as the laminated body is made larger in size, greater in thickness, or higher in density, making it difficult to obtain a non-defective high-density laminated body. On the other hand, the battery 1 according to the present embodiment makes it easy for air to be discharged, as the slit 40 is connected to the outer edge of the first collector 11. This makes it possible to achieve an elaborate highly-reliable battery 1 with few structural defects.

Further, the battery 1 according to the present embodiment, which is superior in discharging air, also brings about an effect of making it possible to raise pressure in a laminating pressurization process and making it possible to shorten the duration of pressurized retention. This brings about improvement in productivity as well as an effect of enhancing the reliability and performance of the battery 1. This brings about a remarkably great industrial utility value.

Further, in the case of laminating at increased temperature, a residual solvent and a binder component may evaporate from the solid electrolyte layer 30, the first active material layer 12, and the second active material layer 22 to cause structural defects. The slit 40 is also effective in discharging these vaporized gases.

Furthermore, since the slit 40 is filled with part of the first active material layer 12 in contact with the first collector 11, the bonding of the side walls 41 and 42 of the slit 40 and the filling component makes it possible to bring about a stronger anchoring effect. Such improvement in adhesiveness of the first collector 11 is effective in improving reliability against repeated charge and discharge characteristics and cold cycles.

According to the foregoing configuration, the slit 40, which is provided as a notch extending from the outer edge of the first collector 11, effectively facilitates the discharge of air even if the collector surface is closed by a press head during compression. This not only reduces structural defects such as delamination attributed to air but also gives an elaborate laminated body with reduced air holes. This working effect makes it possible to achieve a large-size and low-profile battery 1.

Making comparisons between the configuration of the battery 1 according to the present embodiment and the configurations of the batteries described in Japanese Unexamined Patent Application Publication No. 11-288723 and Japanese Unexamined Patent Application Publication No. 7-335209 gives the following differences.

Japanese Unexamined Patent Application Publication No. 11-288723 describes a lithium-ion battery having a plurality of holes provided in an inner region of a collector. However, the holes are not provided in an outer peripheral region, and there is no hole communicating with an outer periphery. For this reason, holes provided in a press surface are closed in a case where the battery is laminated and subjected to a pressurized press, with the result that air tends to remain within the laminated body.

Meanwhile, Japanese Unexamined Patent Application Publication No. 7-335209 describes a storage battery having a porous metal film used as a collector. In the storage battery disclosed in Japanese Unexamined Patent Application Publication No. 7-335209 too, as in the case of Japanese Unexamined Patent Application Publication No. 11-288723, there is no hole connected to an outer edge of the collector. Further, the storage battery according to Japanese Unexamined Patent Application Publication No. 7-335209 uses a liquid electrolyte and therefore differs from the configuration that reduces defects in a solid-state structure within an all-solid battery.

On the other hand, the battery 1 according to the present embodiment reduces problems such as those mentioned above. Further, Japanese Unexamined Patent Application Publication No. 11-288723 and Japanese Unexamined Patent Application Publication No. 7-335209 neither disclose nor suggest a battery 1, described in the present embodiment, that includes a slit 40 connected to an outer edge of a first collector 11.

Modifications

Figure 3:
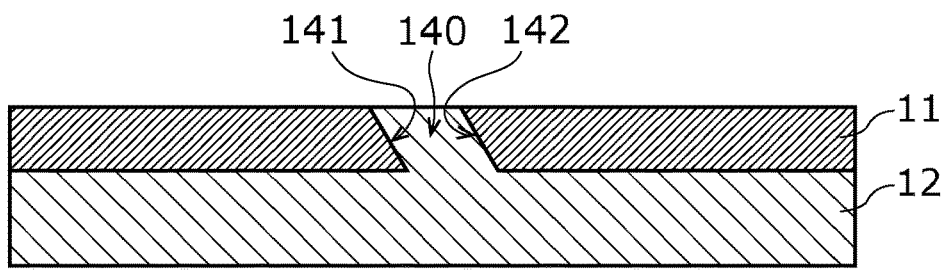
FIG. 3 is a cross-sectional view schematically showing Modification 1 of a configuration of a cross-section of a slit provided in the collector of the battery according to Embodiment 1.
Figure 4:
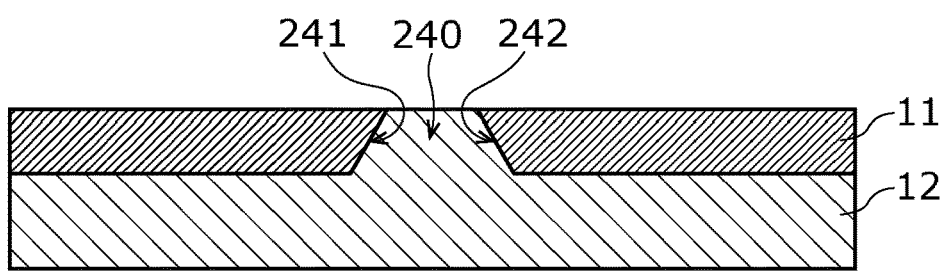
FIG. 4 is a cross-sectional view schematically showing Modification 2 of a configuration of a cross-section of a slit provided in the collector of the battery according to Embodiment 1.
Figure 5:
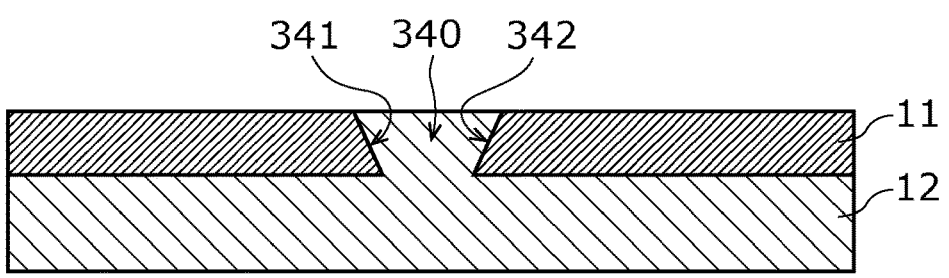
FIG. 5 is a cross-sectional view schematically showing Modification 3 of a configuration of a cross-section of a slit provided in the collector of the battery according to Embodiment 1.

The following describes modifications of cross-sectional shapes of slits 40 with reference to FIGS. 3 to 5. First, Modification 1 is described with reference to FIG. 3.

FIG. 3 is a cross-sectional view schematically showing Modification 1 of a configuration of a cross-section of a slit provided in the first collector 11 of the battery 1 according to the present embodiment. The first collector 11 may be provided with a slit 140 shown in FIG. 3.

The slit 140 has its side walls 141 and 142 inclined with respect to the thickness direction of the first collector 11. As shown in FIG. 3, the side walls 141 and 142 are parallel to each other. That is, the distance between the side walls 141 and 142, i.e. the width of the slit 140, is constant.

Thus, the inclination of the side walls 141 and 142 makes it possible to increase the area of contact with a component of an active material layer with which the slit 140 is filled. This makes it possible to further strengthen the bondability between the first collector 11 and the first active material layer 12.

In a case where the first collector 11 is provided with a plurality of the slits 140, the side walls of each of the plurality of slits 140 may be inclined at different angles. The cross-sectional shape of the slit 140 and the state of being filled with part of the first active material layer 12 can be checked, for example, by simply using a microscope or other devices to observe a cross-section exposed by cutting the first collector 11 with a cutter or a cross-section created by means such as ion milling.

Next, Modification 2 is described with reference to FIG. 4. FIG. 4 is a cross-sectional view schematically showing Modification 2 of a configuration of a cross-section of a slit provided in the first collector 11 of the battery 1 according to the present embodiment. The first collector 11 may be provided with a slit 240 shown in FIG. 4.

The slit 240 has its side walls 241 and 242 inclined with respect to the thickness direction of the first collector 11. The side walls 241 and 242 become farther away from each other toward the second electrode 20 and become closer to each other toward an opposite side. That is, the cross-sectional shape of the slit 240 is a trapezoidal shape having a first side beside the second electrode 20 and a second side opposite the first side with the first side being longer than the second side. That is, the width of the slit 240 becomes gradually narrower away from the second electrode 20 in the thickness direction of the first collector 11.

Thus, the inclination of the side walls 241 and 242 makes it possible to increase the area of contact with a component of an active material layer with which the slit 240 is filled. This makes it possible to further strengthen the bondability between the first collector 11 and the first active material layer 12.

Next, Modification 3 is described with reference to FIG. 5. FIG. 5 is a cross-sectional view schematically showing Modification 3 of a configuration of a cross-section of a slit provided in the first collector 11 of the battery 1 according to the present embodiment. The first collector 11 may be provided with a slit 340 shown in FIG. 5.

The slit 340 has its side walls 341 and 342 inclined with respect to the thickness direction of the first collector 11. The side walls 341 and 342 become closer to each other toward the second electrode 20 and become farther away from each other toward an opposite side. That is, the cross-sectional shape of the slit 340 is a trapezoidal shape having a first side beside the second electrode 20 and a second side opposite the first side with the first side being shorter than the second side. That is, the width of the slit 340 becomes gradually greater away from the second electrode 20 in the thickness direction of the first collector 11.

Thus, the filling of the slit 340 with the component of the first active material layer 12 causes the filling component in the slit 340 to be caught even in a case where delamination stress acts on the first collector 11. This reduces the likelihood of delamination of the first collector 11, making it possible to further reduce structural defects and strengthen the bondability of the first collector 11.

Further, the plurality of slits 40, 140, 240, or 340 are provided in point symmetry with respect to the center of the first collector 11. This makes it possible to obtain more uniform laminated bodies, bringing about an effect of reducing warpage.

Embodiment 2

The following describes Embodiment 2. Embodiment 2 differs from Embodiment 1 primarily in that the second collector too is provided with a slit. The following describes Embodiment 2 with a focus on differences from Embodiment 1 and omits or simplifies a description of common features.

Figure 6:
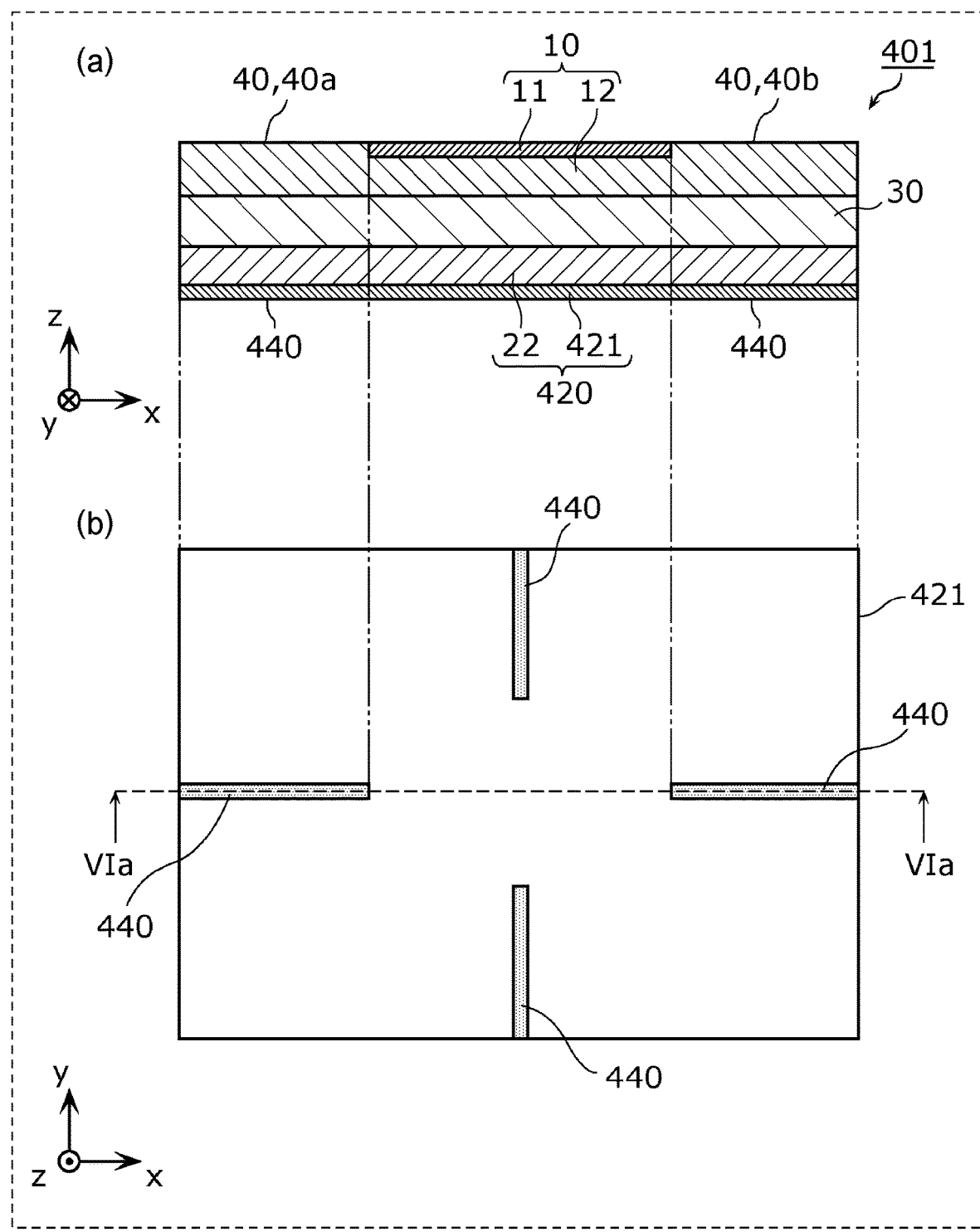
FIG. 6 illustrates a cross-sectional view and a plan view schematically showing a configuration of a battery according to Embodiment 2.

FIG. 6 illustrates a cross-sectional view and a plan view schematically showing a configuration of a battery 401 according to Embodiment 2. Specifically, (a) of FIG. 6 is a cross-sectional view of the battery 401. (b) of FIG. 6 is a plan view of the battery 401 as seen from the positive side of the z axis through the first electrode 10, the solid electrolyte layer 30, and the second active material layer 22. That is, (b) of FIG. 6 is a plan view of the second collector 421 as seen from the positive side of the z axis. (a) of FIG. 6 shows a cross-section taken along line VIa-VIa in (b) of FIG. 6.

As shown in FIG. 6, the battery 401 according to the present embodiment differs from the battery 1 according to Embodiment 1 in that the battery 401 includes a second electrode 420 instead of the second electrode 20. The second electrode 420 includes a second collector 421 and a second active material layer 22. The second active material layer 22 is not described here, as it is substantially the same as that of Embodiment 1, albeit different, for example, in shape from that of Embodiment 1.

The second collector 421 is provided with at least one slit 440. The at least one slit 440 is an example of a second slit, the at least one slit 440 penetrates the second collector 421 in a thickness direction and is connected to an outer edge of the second collector 421.

The slit 440 provided in the second collector 421 is similar to the slit 40 provided in the first collector 11. Specifically, a configuration that is applied to the slit 40, 140, 240, or 340 is also applicable to the slit 440. For example, the second collector 421 has four slits 440 arranged in point symmetry. The four slits 40 and the four slits 440 may be identical in position and shape to each other in plan view. The slit 40, which is provided in the first collector 11, is similar to the slit 440, which is provided in the second collector 421, may be different in at least one of number, position, and shape of slits from each other. This makes it possible to change the state of compression of the first active material layer 12, the second active material layer 22, and the solid electrolyte layer 30, which are included in a laminated body. For this reason, the shapes and arrangements of the slits 40 and 440 may be set as appropriate for the purpose of reducing not only structural defects but also warpage of the battery 401.

Further, the slit 440 may be identical in cross-sectional shape to the slit 40, 140, 240, or 340 shown in FIGS. 2 to 5. Then, the slit 40, 140, 240, or 340, which is provided in the first collector 11, and the slit 440, which is provided in the second collector 421, may be different in side wall inclination from each other. Providing a plurality of slits that are different in side wall inclination from each other makes it possible to increase endurance against delamination stresses acting in different directions.

As noted above, in the battery 401 according to the present embodiment, the slits 40 and 440 provided in both of the two collectors make it easier to discharge air. Further, the action of an anchoring effect by members that are filled separately by each of the slits 40 and 440 makes it possible to reduce the occurrence of structural defects and warpage of even a further thinned battery.

Embodiment 3

The following describes Embodiment 3. Embodiment 3 differs from Embodiment 1 primarily in planimetric shape of a slit provided in the first collector. The following describes Embodiment 3 with a focus on differences from Embodiment 1 and omits or simplifies a description of common features.

Figure 7:
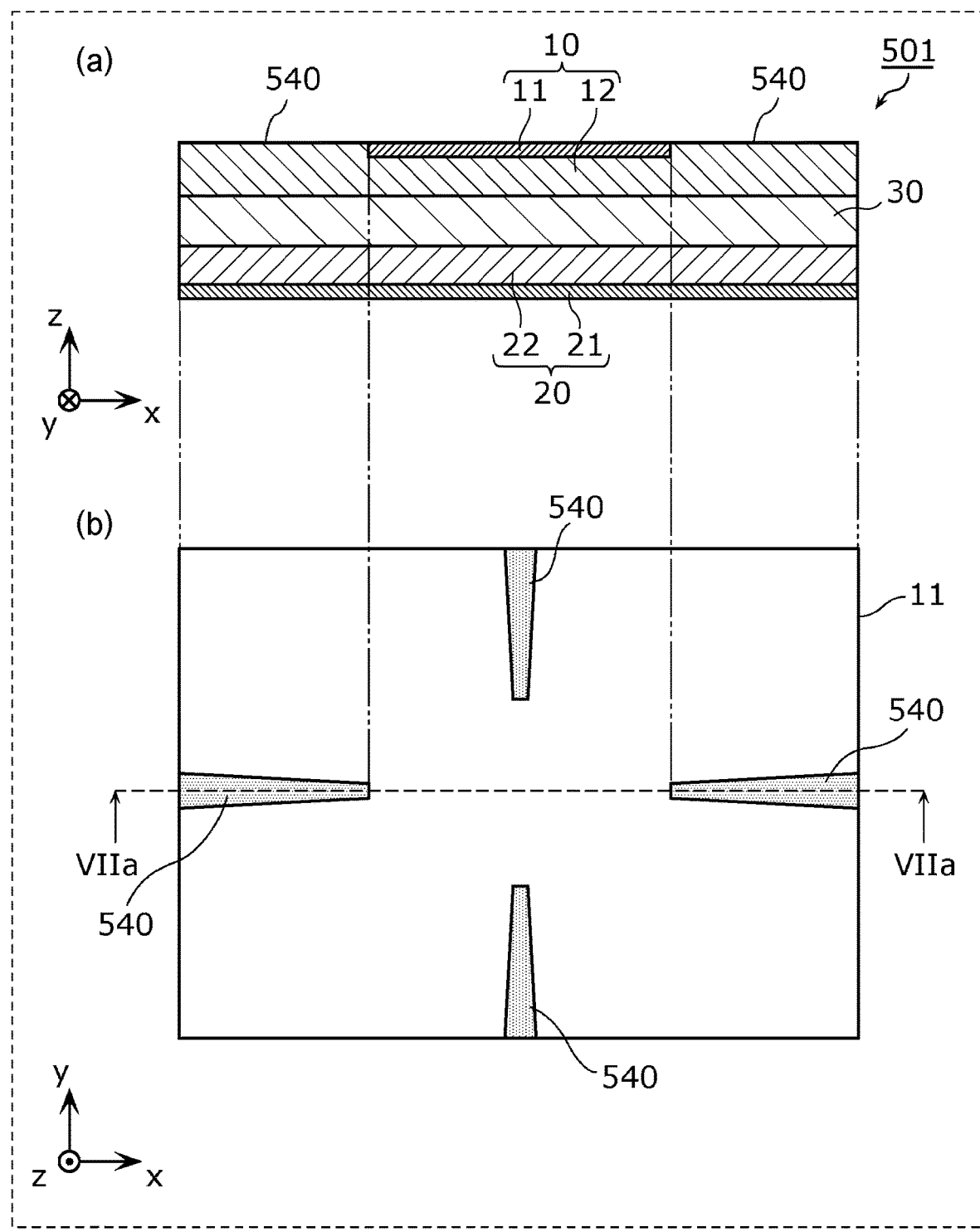
FIG. 7 illustrates a cross-sectional view and a plan view schematically showing a configuration of a battery according to Embodiment 3.

FIG. 7 illustrates a cross-sectional view and a plan view schematically showing a configuration of a battery 501 according to Embodiment 3. Specifically, (a) of FIG. 7 is a cross-sectional view of the battery 501. (b) of FIG. 7 is a plan view of the battery 501 as seen from the positive side of the z axis. (a) of FIG. 7 shows a cross-section taken along line VIIa-VIIa in (b) of FIG. 7.

As shown in FIG. 7, the battery 501 according to the present embodiment differs from the battery 1 according to Embodiment 1 in that the first collector 11 has a slit 540 instead of the slit 40. The slit 540 has a width that, in plan view, is greater in a portion thereof that is close to the outer edge of the first collector 11 than in a portion thereof that is away from the outer edge. That is, the slit 540 becomes wider toward the outer edge. Minimum and maximum values of the width of the slit 540 both fall within a range of 0.1 mm to 5 mm. The planimetric shape of the slit 540 is a trapezoid elongated in a height direction. That is, the width of the slit 540 becomes greater to a constant degree regardless of distance from the outer edge. Alternatively, the slit 540 may become wider to a higher degree toward the outer edge.

As noted above, in the battery 501 according to the present embodiment, the width of a slit can be made greater toward the outer edge. This makes it possible to further facilitate the discharge of air.

Only one of the plurality of slits that are provided in the first collector 11 may be a slit 540, and the remaining slits may be slits 40. As in the case of Embodiment 2, a slit that is identical in shape to the slit 540 according to the present embodiment may be provided in the second collector 21. Then, the slit 540, which is provided in the first collector 11, and the slit that is provided in the second collector 21 may become wider to different degrees.

Embodiment 4

The following describes Embodiment 4. Embodiment 4 differs from Embodiment 1 primarily in planimetric shape of a slit provided in the first collector. The following describes Embodiment 4 with a focus on differences from Embodiment 1 and omits or simplifies a description of common features.

Figure 8:
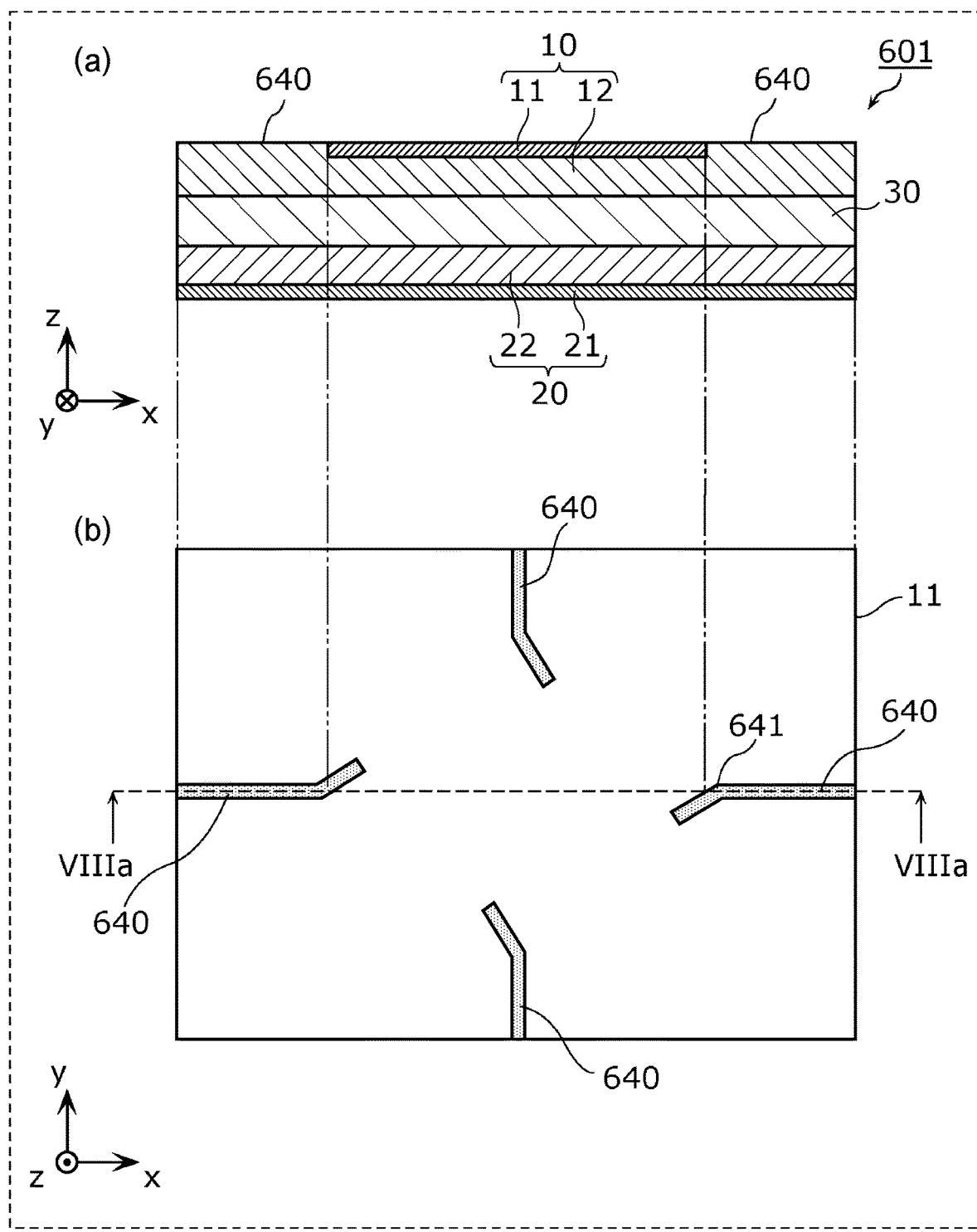
FIG. 8 illustrates a cross-sectional view and a plan view schematically showing a configuration of a battery according to Embodiment 4.

FIG. 8 illustrates a cross-sectional view and a plan view schematically showing a configuration of a battery 601 according to Embodiment 4. Specifically, (a) of FIG. 8 is a cross-sectional view of the battery 601. (b) of FIG. 8 is a plan view of the battery 601 as seen from the positive side of the z axis. (a) of FIG. 8 shows a cross-section taken along line VIIIa-VIIIa in (b) of FIG. 8.

As shown in FIG. 8, the battery 601 according to the present embodiment differs from the battery 1 according to Embodiment 1 in that the first collector 11 has a slit 640 instead of the slit 40. The slit 640 has a bent part 641 in plan view. The slit 640 extends in a first direction from the outer edge of the first collector 11, turns at the bent part 641, and extends in a second direction that is different from the first direction. That is, the slit 640 has the shape of a broken line bent in the middle. The angle formed by the first direction and the second direction is, but is not limited to, an obtuse angle of, for example, more than 90 degrees. The first direction and the second direction may be orthogonal to each other. The bent part 641 is provided in a position that is nearer to an end of the slit 640 close to the center of the first collector 11 than to an end of the slit 640 close to the outer edge of the first collector 11 in a direction in which the slit 640 extends. Alternatively, the bent part 641 may be located either in the center of the slit 640 or closer to the outer edge of the first collector 11 than the center.

As noted above, the battery 601 according to the present embodiment makes it possible, for example, to, in a case where delamination from the first active material layer 12 occurs from the outer edge of the first collector 11, inhibit the progression of the delamination toward the center with the bent part 641 acting as a check. By the first collector 11 having such a slit 640 in the shape of a bent line, the occurrence and spread of structural defects by the stress of repeated charge and discharge and cold cycles can be reduced. This makes it possible to achieve a durable, highly-reliable battery 601.

One slit 640 may have a plurality of the bent parts 641. For example, increasing the number of bent parts 641 further enhances the effect of inhibiting delamination. An appropriate number of bent parts 641 may be provided from the viewpoint of processability and producibility in manufacturing.

Further, the slit 640 may extend in a curved line such as a circular arc or an elliptical arc. That is, the slit 640 may have a smoothly-curved continuous bent part 641. In this case too, the effect of inhibiting delamination of the first collector 11 can be brought about.

Further, only one of the plurality of slits that are provided in the first collector 11 may be a slit 640, and the remaining slits may be slits 40 or 540. As in the case of Embodiment 2, a slit that is identical in shape to the slit 640 according to the present embodiment may be provided in the second collector 21. Then, the slit 640, which is provided in the first collector 11, and the slit that is provided in the second collector 21 may be different in number, position, degree of bending of bent parts 641 from each other.

Embodiment 5

The following describes Embodiment 5. Embodiment 5 differs from Embodiment 1 primarily in that the first active material layer and the second active material layer are each provided only in parts of the principal surfaces of the collectors. The following describes Embodiment 5 with a focus on differences from Embodiment 1 and omits or simplifies a description of common features.

Figure 9:
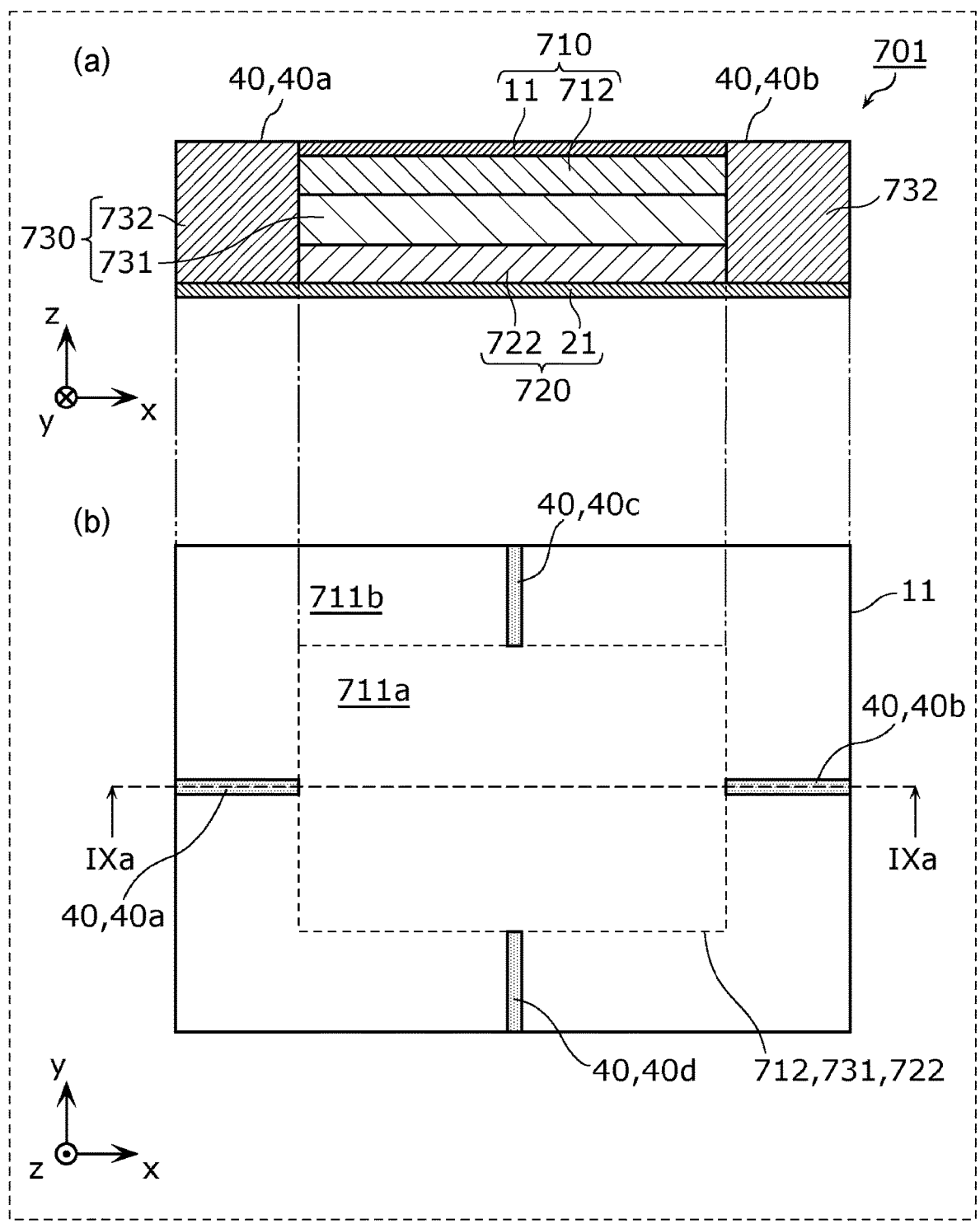
FIG. 9 illustrates a cross-sectional view and a plan view schematically showing a configuration of a battery according to Embodiment 5.

FIG. 9 illustrates a cross-sectional view and a plan view schematically showing a configuration of a battery 701 according to Embodiment 5. Specifically, (a) of FIG. 9 is a cross-sectional view of the battery 701. (b) of FIG. 9 is a plan view of the battery 701 as seen from the positive side of the z axis. (a) of FIG. 9 shows a cross-section taken along line IXa-IXa in (b) of FIG. 9.

As shown in FIG. 9, the battery 701 according to the present embodiment includes a first electrode 710, a second electrode 720, and a solid electrolyte layer 730. The first electrode 710 includes a first collector 11 and a first active material layer 712. The second electrode 720 includes a second collector 21 and a second active material layer 722. The first collector 11 and the second collector 21 are identical to those of Embodiment 1.

The first active material layer 712 and the second active material layer 722 are different in area in plan view from the first active material layer 12 and the second active material layer 22 according to Embodiment 1, respectively. Specifically, the first active material layer 712 is smaller in area than the first collector 11 in plan view. The second active material layer 722 is smaller in area than the second collector 21 in plan view.

For this reason, as shown in (b) of FIG. 9, the first collector 11 includes a first region 711a in contact with the first active material layer 712 and a second region 711b that is not in contact with the first active material layer 712. In the present embodiment, the slit 40 is provided in the second region 711b of the first collector 11 and is not provided in the first region 711a. That is, since the slit 40 and the first active material layer 712 do not overlap each other in plan view, the slit 40 is not filled with a material contained in the first active material layer 712. In other words, the slit 40 does not bite the first active material layer 712.

The solid electrolyte layer 730 includes a first solid electrolyte layer 731 and a second solid electrolyte layer 732. As is the case with the solid electrolyte layer 30 according to Embodiment 1, the first solid electrolyte layer 731 is provided between and in contact with the first active material layer 712 and the second active material layer 722. The first solid electrolyte layer 731 is identical in size and shape to the first active material layer 712 and the second active material layer 722 in plan view.

The second solid electrolyte layer 732 is provided so as to surround all sides of the first active material layer 712, the first solid electrolyte layer 731, and the second active material layer 722. Specifically, the second solid electrolyte layer 732 is provided in the second region 711b of the first collector 11 in plan view. The second solid electrolyte layer 732 overlaps the slit 40 in plan view. Specifically, the slit 40 is filled with part of the second solid electrolyte layer 732.

The second solid electrolyte layer 732 contains the same solid electrolyte as the first solid electrolyte layer 731. Alternatively, the second solid electrolyte layer 732 may contain a solid electrolyte that is different from a solid electrolyte contained in the first solid electrolyte layer 731. For example, the solid electrolyte contained in the second solid electrolyte layer 732 may be made of a highly-deformable material with a smaller Young's modulus than the solid electrolyte contained in the first solid electrolyte layer 731. This makes it easy for the slit 40 to be filled with part of the second solid electrolyte layer 732.

For example, the solid electrolyte contained in the second solid electrolyte layer 732 may be made of a sulfide, an amorphous material, or a highly-deformable material with a smaller Young's modulus. For example, using a material with a Young's modulus smaller than that of the first collector 11 allows the slit 40 provided in the first collector 11 to be filled with part of the second solid electrolyte layer 732 deforming during pressurization. This brings about a strong anchoring effect of bonding firmly to the side walls 41 and 42 of the slit 40.

As noted above, the battery 701 according to the present embodiment makes it possible to, by filling the slit 40 with part of the second solid electrolyte layer 732, which contains a highly-deformable solid electrolyte, causes the anchoring effect to act more strongly to bring about a strong effect of bonding together the first collector 11 and the second solid electrolyte layer 732. This makes it possible to achieve a more highly-reliable battery 701.

As in the case of Embodiment 2, the slit 340 may be provided in the second collector 21. The slit 340 provided in the second collector 21 may be filled with part of the second solid electrolyte layer 732.

Further, the second solid electrolyte layer 732 does not need to surround all sides of the first solid electrolyte layer 731. For example, the second solid electrolyte layer 732 may be provided along one side or two or more sides of the first solid electrolyte layer 731 in plan view. Alternatively, the second solid electrolyte layer 732 may be provided only in a part that, in plan view, overlaps the slit 40 provided in the first collector 11.

Embodiment 6

The following describes Embodiment 6. Embodiment 6 differs from Embodiment 1 primarily in that a plurality of batteries are laminated. The following describes Embodiment 6 with a focus on differences from Embodiment 1 and omits or simplifies a description of common features.

Figure 10:
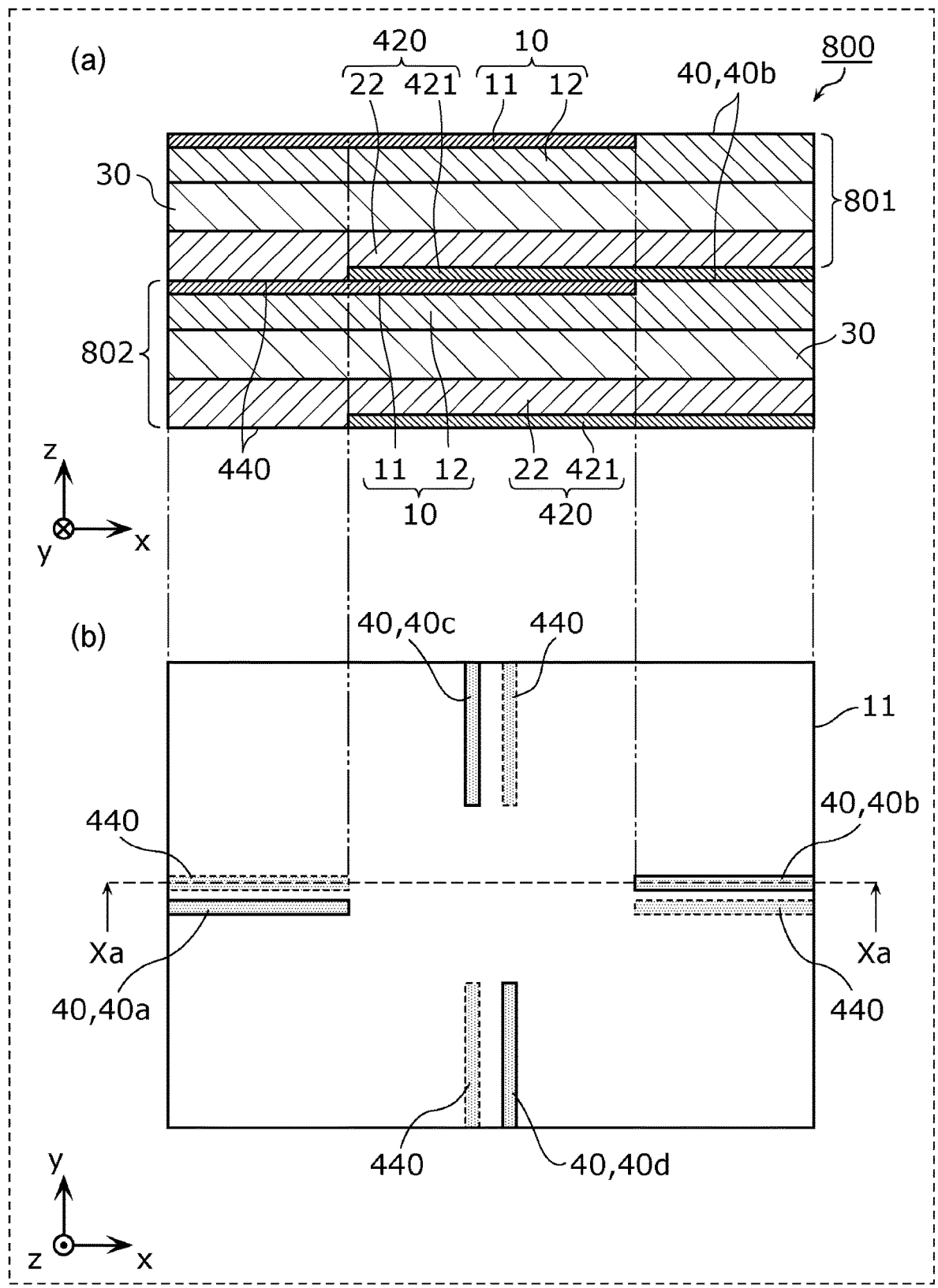
FIG. 10 illustrates a cross-sectional view and a plan view schematically showing a configuration of a laminated battery according to Embodiment 6.

FIG. 10 illustrates a cross-sectional view and a plan view schematically showing a configuration of a laminated battery 800 according to Embodiment 6. Specifically, (a) of FIG. 10 is a cross-sectional view of the laminated battery 800. (b) of FIG. 10 is a plan view of the laminated battery 800 as seen from the positive side of the z axis through a battery 801 on the positive side of the z axis. That is, (b) of FIG. 10 is a plan view of a battery 802 on the negative side of the z axis as seen from the positive side of the z axis. (a) of FIG. 10 shows a cross-section taken along line Xa-Xa in (b) of FIG. 10.

As shown in FIG. 10, the laminated battery 800 includes two batteries 801 and 802. Specifically, the two batteries 801 and 802 are laminated in a thickness direction. The two batteries 801 and 802 are stuck together by applying a conductive adhesive.

In the present embodiment, the two batteries 801 and 802 are electrically connected in series. Specifically, one of the two batteries 801 and 802 has its positive electrode connected directly to a negative electrode of the other of the two batteries 801 and 802. For example, the second collector 421 of the battery 801 and the first collector 11 of the battery 802 constitute a so-called bipolar electrode with one of the collectors serving as a positive electrode and the other of the collectors serving as a negative electrode. For example, in each of the batteries 801 and 802, the first collector 11 serves as a positive-electrode collector, and the second collector 421 serves as a negative-electrode collector.

Each of the batteries 801 and 802 are similar in configuration to the battery 401 according to Embodiment 2. Specifically, each of the batteries 801 and 802 has a slit 40 formed in the first collector 11 and a slit 440 formed in the second collector 421. (b) of FIG. 10 uses dashed lines to indicate the slit 440 provided in the second collector 421 of the battery 801.

As shown in (b) of FIG. 10, the slit 40 and the slit 440 do not overlap each other in plan view. Specifically, the slit 40 provided in the first collector 11 of the battery 802 is closed by the second collector 421 of the battery 801. For this reason, part of the first active material layer 12 of the battery 802 with which the slit 40 is filled is not contact with the second active material layer 22 of the battery 801. Similarly, the slit 440 provided in the second collector 421 of the battery 801 is closed by the first collector 11 of the battery 802. For this reason, part of the second active material layer 22 of the battery 801 with which the slit 440 is filled is not contact with the first active material layer 12 of the battery 802. Since the slit 40 and the slit 440 do not overlap each other in plan view, the respective active materials of different polarity of the two batteries 801 and 802 thus laminated can be prevented from being contact with each other.

As noted above, a slit is provided in a collector of each of the plurality of batteries 801 and 802. This makes it possible to reduce air and structural defects in each of the batteries 801 and 802, securing uniformity within the laminated body and reducing warpage. This makes it possible to achieve multi-layering by joining the plurality of batteries 801 and 802 on top of each other.

Further, in the laminated battery 800 according to the present embodiment, the plurality of batteries 801 and 802 can be connected in series, as the slit 40 and the slit 440 do not overlap each other in plan view. This makes it possible to achieve a high-energy and highly-reliable laminated battery compatible with higher voltage.

The slit 40 does not need to be provided in the first collector 11 of the battery 801. Further, the slit 440 does not need to be provided in the second collector 421 of the battery 802, either.

Further, the slit 440 does not need to be provided in the second collector 421 of the battery 801. This allows the slit 40 provided in the first collector 11 of the battery 802 to be surely closed by the second collector 421. Similarly, the slit 40 does not need to be provided in the first collector 11 of the battery 802. This allows the slit 440 provided in the second collector 421 of the battery 801 to be surely closed by the first collector 11.

Further, the laminated battery 800 may include a battery 1, 401, 501, 601, or 701 instead of at least one of the batteries 801 and 802. Further, the number of batteries that are laminated in the laminated battery 800 is not limited to 2 but may be greater than or equal to 3.

Embodiment 7

The following describes Embodiment 7. Embodiment 7 differs from Embodiment 1 primarily in that a plurality of batteries are laminated. The following describes Embodiment 7 with a focus on differences from Embodiment 1 and omits or simplifies a description of common features.

Figure 11:
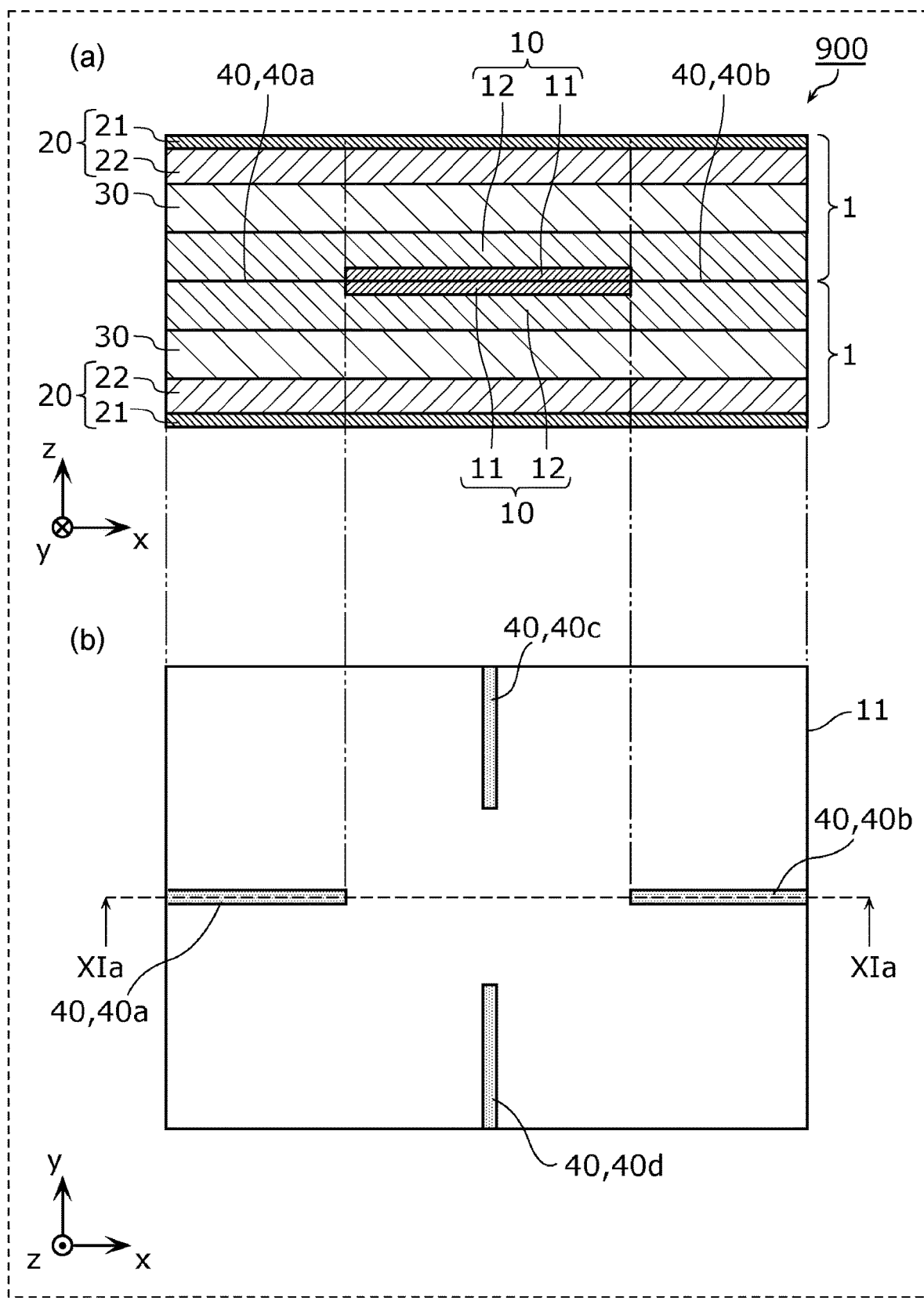
FIG. 11 illustrates a cross-sectional view and a plan view schematically showing a configuration of a laminated battery according to Embodiment 7.

FIG. 11 illustrates a cross-sectional view and a plan view schematically showing a configuration of a laminated battery 900 according to Embodiment 7. Specifically, (a) of FIG. 11 is a cross-sectional view of the laminated battery 900. (b) of FIG. 11 is a plan view of the laminated battery 900 as seen from the positive side of the z axis through a battery 1 on the positive side of the z axis. That is, (b) of FIG. 11 is a plan view of a battery 1 on the negative side of the z axis as seen from the positive side of the z axis. (a) of FIG. 11 shows a cross-section taken along line XIa-XIa in (b) of FIG. 11.

As shown in FIG. 11, the laminated battery 900 includes two batteries 1. Specifically, the two batteries 1 are laminated in a thickness direction. The two batteries 1 are stuck together by applying a conductive adhesive.

In the present embodiment, the two batteries 1 are electrically connected in parallel. Specifically, the two batteries 1 have their positive or negative electrodes connected directly to each other. For example, the two batteries 1 have their first collectors 11 connected to each other.

As in the case of Embodiment 1, the first collector 11 is provided with a slit 40. In the present embodiment, at least parts of the respective slits 40 of the two batteries 1 overlap each other in plan view. For example, as shown in (b) of FIG. 11, the four slits 40 provided in the first collector 11 of one of the two batteries 1 and the four slits 40 provided in the first collector 11 of the other of the two batteries 1 are in strict correspondence with each other in plan view.

This causes the first active material layers 12 to be shared through the slits 40, thus making it possible to obtain a strong bond between the two batteries 1. This makes it possible to achieve a highly-reliable laminated battery 900.

Further, the laminated battery 900 may include a battery 401, 501, 601, 701, 801, or 802 instead of at least one of the two batteries 1. For example, in a case where the laminated battery 900 includes two batteries 701, the second solid electrolyte layer 732 may contain a powder, such as a sulfide solid electrolyte, that entails sintering in a powder compacting process. This allows the batteries 701 to be easily integrated with each other via the slits 40. Such an effect makes it possible to obtain high bonding reliability.

Further, the number of batteries that are laminated in the laminated battery 900 is not limited to 2 but may be greater than or equal to 3.

Method for Manufacturing Battery

Next, an example of a method for manufacturing a battery and a laminated battery according to any of the foregoing embodiments is described. The following describes a method for manufacturing a laminated battery 800 according to Embodiment 6 shown in FIG. 10.

First, pastes are prepared for use in the formation of a first active material layers 12 (specifically a positive-electrode active material layer) and a second active material layer 22 (specifically a negative-electrode active material layer) by printing. As a solid electrolyte raw material for use in a compound of each of the positive-electrode and negative-electrode active material layers, for example, a glass powder of a $Li_2S$—$P_2S_5$ sulfide composed primarily of a triclinic crystal is prepared with an average particle diameter of approximately 10 μm. A usable example of this glass powder has a high ion conductivity higher than or equal to $2\times10^{-3}$ S/cm and lower than or equal to $3\times10^{-3}$ S/cm. As a positive-electrode active material, for example, a powder of a lamellarly-structured Li—Ni—Co—Al complex oxide ($LiNi_{0.8}Co_{0.15}Al_{0.05}O_2$) with an average particle diameter of approximately 5 μm is used. A paste for use as the positive-electrode active material layer is prepared by dispersing, in an organic solvent or other substances, a compound containing the aforementioned positive-electrode active material and the aforementioned glass powder. Further, as a negative-electrode active material, for example, a powder of natural graphite with an average particle diameter of approximately 10 μm is used. A paste for use as the negative-electrode active material layer is similarly prepared by dispersing, in an organic solvent or other substances, a compound containing the aforementioned negative-electrode active material and the aforementioned glass powder.

Next, as materials for use as a first collector 11 (specifically a positive-electrode collector) and a second collector 21 (specifically a negative-electrode collector), for example, sheets of copper foil with a thickness of approximately 15 μm are prepared. The paste for use as the positive-electrode active material layer and the paste for use as the negative-electrode active material layer are printed by a screen printing method into predetermined shapes with thicknesses greater than or equal to approximately 50 μm and smaller than or equal to approximately 100 μm separately on one surface of each of the sheets of copper foil. The paste for use as the positive-electrode active material layer and the paste for use as the negative-electrode active material layer attain thicknesses greater than or equal to 30 μm and smaller than or equal to 60 μm by being dried in a temperature range of 80° C. to 130° C. This gives collectors (sheets of copper foil) on which the positive-electrode active material layer and the negative-electrode active material layer are formed, respectively, i.e. a first electrode 10 (specifically a positive electrode) and a second electrode 20 (specifically a negative electrode).

Next, a paste for use as a solid electrolyte layer is prepared by dispersing, in an organic solvent or other substances, a compound containing the aforementioned glass powder. The aforementioned paste for use as the solid electrolyte layer is printed through a metal mask with a thickness of, for example, approximately 100 μm on a surface of each of the positive-electrode and negative-electrode active material layers. After that, the positive and negative electrodes on which the paste for use as the solid electrolyte layer has been printed are dried in a temperature range of 80° C. to 130° C.

Next, at least either the positive electrode or the negative electrode is cut into the shape of a slit 40 with a cutter blade by the thickness of the collector from a surface of the collector. Then, the slits 40 and 440 are formed by removing the cut portion of the collector while leaving the active material layer. A slit may be formed in only either the positive electrode or the negative electrode.

Next, the solid electrolyte printed on the positive-electrode active material layer of the positive electrode and the solid electrolyte printed on the negative-electrode active material layer of the negative electrode are laminated in such a manner as to be in contact with and face each other.

Next, an elastic sheet with a modulus of elasticity of $5\times10^6$ Pa is inserted between a press die plate and a collector upper surface. The thickness of the elastic sheet is for example 70 μm. After that, the press die plate is pressurized for 90 seconds while being heated to 50° C. under a pressure of 300 MPa. During this pressurization, part of the active material layer infiltrates into the slit 40 and is contact with the side walls 41 and 42 of the slit 40. For example, in a case where the thickness of the collector is approximately 15 μm, the slit 40 is filled with part of the active material layer in a range of 10 μm to 15 μm.

Next, a thermosetting conductor paste containing silver particles is screen-printed with a thickness of approximately 30 μm on a collector surface of the battery 801 thus fabricated, and another battery 802 is placed in a predetermined position and subjected to pressure bonding. At this point in time, the slit 40 is closed by the other collector when the two batteries 801 and 802 are bonded to each other. This is repeated a predetermined number of batteries needed for multi-layering. After that, the intermediate product is left at rest under a pressure of, for example, approximately 1 $kg/cm^2$, subjected to 60 minutes of thermal curing at a temperature higher than or equal to approximately 100° C. and lower than or equal to approximately 300° C., and cooled to room temperature.

Through these steps, a laminated battery 800 is fabricated. The method and procedure for fabricating a battery 1 and a laminated battery 800 are not limited to the aforementioned examples.

Although the aforementioned manufacturing method has illustrated an example in which the paste for use as the positive-electrode active material layer, the paste for use as the negative-electrode active material layer, the paste for use as the solid electrolyte layer, and the conductor paste are applied by printing, this is not intended to impose any limitation. Usable examples of printing methods include a doctor blade method, a calendar method, a spin coat method, a dip coat method, an inkjet method, an offset method, a die coat method, and a spray method. The method for forming a slit 40 in a collector may be a technique such as laser cutting or die-punching.

Although the foregoing manufacturing method has taken, as an example of the conductor paste, a thermosetting conductor paste containing metal particles of silver, this is not intended to impose any limitation. Further, a resin for use in the thermosetting conductor paste needs only be one that functions as a binding binder and, furthermore, an appropriate one, such as a printable or coatable resin, selected according to the manufacturing process adopted. Examples of the resin for use in the thermosetting conductor paste include thermosetting resins. Examples of thermosetting resins include (i) amino resins such as urea resins, melamine resins, and guanamine resins, (ii) epoxy resins such as bisphenol A, bisphenol F, novolac phenolic resins, and alicyclic resins, (iii) oxetane resins, (iv) phenol resins such as resol resins and novolak resins, and (v) silicone denatured organic resins such as silicone epoxy and silicone polyester. As the resin, only one of these materials may be used, or a combination of two or more of these materials may be used.

Other Embodiments

In the foregoing, a battery and a laminated battery according to the present disclosure have been described with reference to embodiments; however, the present disclosure is not intended to be limited to these embodiments. Applications to the present embodiments of various types of modification conceived of by persons skilled in the art and other embodiments constructed by combining some constituent elements of the embodiments are encompassed in the scope of the present disclosure, provided such applications and embodiments do not depart from the spirit of the present disclosure.

For example, only one first slit may be provided in the first collector. Further, the first slit provided in the first collector may extends from one end of the first collector to the other. That is, the at least one first slit may be provided in such a manner as to divide the first collector into a plurality of the first collectors. A plurality of the first slits may be connected to the outer edge of the first collector by extending radially from the center to the vicinity of the center of the first collector. The same may apply to the second slit.

Further, the foregoing embodiments are subject, for example, to various changes, substitutions, additions, and omissions in the scope of the claims or the scope of equivalents thereof.

A battery and a laminated battery according to the present disclosure may be used as secondary batteries such as all-solid batteries for use, for example, in various types of electronics, automobiles, or other devices.

What is claimed is:

1. A battery comprising:
   a first electrode;
   a second electrode; and
   a solid electrolyte layer located between the first electrode and the second electrode,
   wherein
   the first electrode includes
      a first collector, and
      a first active material layer located between the first collector and the solid electrolyte layer,
   the first collector has at least one first slit, the at least one first slit penetrating the first collector in a thickness direction and being connected to an outer edge of the first collector, and
   the at least one first slit is entirely filled with a material contained in a layer in contact with a surface of the first collector that faces toward the second electrode.

2. The battery according to claim 1, wherein the at least one first slit comprises a plurality of the first slits.

3. The battery according to claim 2, wherein
   the first collector is oblong or square in planimetric shape, and
   the plurality of first slits consist of four first slits connected separately to a middle of each of sides of the first collector in plan view.

4. The battery according to claim 2, wherein the plurality of first slits are provided in point symmetry with respect to a center of the first collector in plan view.

5. The battery according to claim 1, wherein the at least one first slit has a side wall inclined with respect to the thickness direction of the first collector.

6. The battery according to claim 5, wherein the at least one first slit has a cross-sectional shape that is a trapezoidal shape having a first side beside the second electrode and a second side opposite the first side with the first side being shorter than the second side.

7. The battery according to claim 1, wherein the at least one first slit has a width that, in plan view, is greater in a portion thereof that is close to the outer edge of the first collector than in a portion thereof that is away from the outer edge.

8. The battery according to claim 1, wherein the at least one first slit has a bent part in plan view.

9. The battery according to claim 1, wherein the first slit has a width greater than or equal to 0.1 mm and less than or equal to 5 mm.

10. The battery according to claim 1, wherein
    the first slit extends in one direction from the outer edge toward an inner side of the first collector, and
    a length of the first slit in the one direction is greater than or equal to 6% of a length of the first collector in the one direction.

11. The battery according to claim 10, wherein the length of the first slit in the one direction is less than 50% of the length of the first collector in the one direction.

12. The battery according to claim 1, wherein
    the first active material layer is smaller in area than the first collector in plan view, and
    the first collector includes
       a first region in contact with the first active material layer, and
       a second region in contact with the solid electrolyte layer.

13. The battery according to claim 12, wherein the at least one first slit is provided in the second region and is not provided in the first region.

14. The battery according to claim 1, wherein the layer is the first active material layer or the solid electrolyte layer.

15. The battery according to claim 1, wherein
    the second electrode includes
       a second collector, and
       a second active material layer located between the second collector and the solid electrolyte layer, and
    the second collector has at least one second slit, the at least one second slit penetrating the second collector in a thickness direction and being connected to an outer edge of the second collector.

16. A laminated battery comprising a first battery and a second battery each of which is the battery according to claim 1,
    wherein the first battery is laminated on a surface of the first collector of the second battery that faces away from the first active material layer.

17. The laminated battery according to claim 16, wherein the first collector of the first battery and the first collector of the second battery are collectors that are different in polarity from each other, the first battery and the second battery are laminated so that the first collectors are in contact with each other, and the at least one first slit of the first battery does not overlap any of the at least one first slit of the second battery in plan view.

18. The laminated battery according to claim 16, wherein
the first collector of the first battery and the first collector of the second battery are collectors that are identical in polarity to each other, the first battery and the second battery are laminated so that the first collectors are in contact with each other, and at least part of the at least one first slit of the first battery overlaps the at least one first slit of the second battery in plan view.

* * * * *